US006847142B2

(12) United States Patent
Ritterhoff

(10) Patent No.: US 6,847,142 B2
(45) Date of Patent: Jan. 25, 2005

(54) TORQUE MOTOR

(75) Inventor: Jürgen Ritterhoff, Bad Schwartau (DE)

(73) Assignee: Howaldtswerke-Deutsche Werft AG, Kiel (DE)

(*) Notice: Subject to any disclaimer, the term of this patent is extended or adjusted under 35 U.S.C. 154(b) by 165 days.

(21) Appl. No.: 10/221,076

(22) PCT Filed: Jan. 20, 2001

(86) PCT No.: PCT/DE01/00243
§ 371 (c)(1),
(2), (4) Date: Nov. 4, 2002

(87) PCT Pub. No.: WO01/67581
PCT Pub. Date: Sep. 13, 2001

(65) Prior Publication Data
US 2003/0178895 A1 Sep. 25, 2003

(30) Foreign Application Priority Data
Mar. 9, 2000 (DE) .......................... 100 11 591

(51) Int. Cl.⁷ ............................................. H02K 47/04
(52) U.S. Cl. ..................................................... 310/113
(58) Field of Search ........................ 310/113, 178, 310/180; 318/139

(56) References Cited
U.S. PATENT DOCUMENTS

| 2,710,371 A | * | 6/1955 | Baensch ..................... 318/139 |
| 4,435,663 A | * | 3/1984 | Gambino et al. ........... 310/306 |
| 5,678,647 A |   | 10/1997 | Wolfe et al. ................ 180/65.3 |
| 5,741,605 A |   | 4/1998 | Gillett et al. ................. 429/31 |
| 5,923,106 A |   | 7/1999 | Isaak et al. |
| 6,005,322 A | * | 12/1999 | Isaak et al. ................. 310/178 |
| 6,580,191 B2 | * | 6/2003 | Lennox ...................... 310/178 |
| 6,664,693 B2 | * | 12/2003 | Leger et al. ................ 310/180 |

FOREIGN PATENT DOCUMENTS

| EP | 0 752 565 B1 | 1/1997 | |
| JP | 11283654 A | 10/1999 | ............ H01M/8/04 |

* cited by examiner

Primary Examiner—Joseph Waks
(74) Attorney, Agent, or Firm—Cohen, Pontani, Lieberman & Pavane

(57) ABSTRACT

A torque motor, especially a fuel cell torque motor, converts chemically stored energy of liquid or gaseous fuels, directly inside the torque motor while avoiding a separate installation of devices, into mechanical energy for driving at least one consumer. The torque motor is provided with fuel cells that serve as an internal energy source, the fuel cells being arranged in the stator around the rotational axis of the motor in an annular manner. The torque motor includes a rotor and stator with permanent magnets arranged on the rotor and with armature windings located in the stator. The armature windings are supplied with current from a commutator having electronic power components. Fuel cell modules and fuel cell supply and control elements are integrated in the commutator in a structurally modular-like manner. The permanent magnets are arranged with a drum-like or disk-like design on the rotational axis of the fuel cell torque motor, thereby eliminating an external excitation of the electric torque motor in the rotor.

6 Claims, 2 Drawing Sheets

TORQUE MOTOR

PRIORITY CLAIM

This is a U.S. national stage of application No. PCT/DE01/00243, filed on Jan. 20, 2001. Priority is claimed on that application and on the following application(s): Country: Germany, Application No.: 100 11 591.8, Filed: Mar. 9, 2000.

BACKGROUND OF THE INVENTION

1. Field of the Invention

The invention relates to a torque motor, in particular to a fuel cell torque motor, which converts the chemically stored energy of liquid or gaseous fuels directly within the torque motor, bypassing any separate equipment, to a mechanical power for driving at least one load.

2. Description of the Prior Art

The prior art is for the electrical power which is produced from chemically stored energy in liquid or gaseous fuels in a separate fuel cell system, comprising:

a fuel cell stack, a supply module comprising a hydrogen and oxygen gas store, an electrical switching and monitoring system, a DC/DC controller/DC/AC controller, to be supplied via an electrical cable or busbar system to a conventional DC-controlled or converter-controlled AC motor installed separately from this system, which then supplies the rotary drive for the load (generator for electricity generation, propeller shaft for driving ships or a gearbox or hub shaft for driving the axles of vehicles) (FIG. 1).

The energy that is bound chemically in hydrogen/oxygen is intended to be supplied with as few losses as possible via energy conversion to the load, that is to say the processing machine.

Fuel cells directly convert (without any internal combustion engine or generator) the chemically bound energy to electrical power. Electric motors with permanent magnet fields convert electrical power to mechanical rotation energy, without any excitation losses, and with high efficiency.

The disadvantage of the prior art is the complexity involved in the transmission, by means of cables and subject to losses, of the power (DC current) which is produced in the fuel cells (energy converter 1: chemical energy to electrical current) via cables, switching and protection apparatuses to the conventionally separately installed electric motor (energy converter 2: electrical power to mechanical power).

SUMMARY OF THE INVENTION

The object of the invention is therefore to convert the chemically bound energy directly to mechanical rotation energy. According to the invention, this object is achieved by the features of claims 1 to 6, which provide for the two energy converters to be integrated in one compact energy converter.

The torque motor is accordingly provided with fuel cells as the internal power source, in which case, according to one preferred feature of the invention, these fuel cells are arranged in the stator, in an annular shape around the rotation axis of the motor.

According to one particular feature of the invention, the motor comprises a rotor and a stator with permanent magnets arranged on the rotor and armature turns located in the stator, which are fed from a commutator having power-electronic components, with fuel cell modules and fuel cell supply and control elements being integrated physically in the form of modules in the commutator having power-electronic components.

According to a further feature, the permanent magnets are arranged in a rotationally symmetrical manner in the form of a drum or disc on the rotation axis of the fuel cell torque motor, and without there being any external excitation for the electric torque motor in the rotor.

According to another feature, the production of the armature current and the commutation are carried out in the stator of the torque motor, with these being electrically fed directly from the fuel cell modules which are each associated with the stator packs in the form of modules.

The control and regulation for the fuel cell process and the electric motor power and/or rotation speed regulation are physically integrated in the stator.

Compact motors with permanent magnet excitation are fitted on the rotating part with only the permanent magnets, without any external power supply. The armature turns are located in the stator and are fed from modular power electronics in terms of the armature current power, clocking and direction. These power electronics modules contain physically integrated fuel cell modules, which feed their electrical output power directly into the power electronics modules, in the form of direct current. The electrical direct current is supplied to the commutator, which is likewise arranged in an annular shape in the inner circle, is electrically coupled and has power-electronic components. The insertion of the fuel cell modules in the internal configuration of the motor avoids external electrical/magnetic losses, and reduces the physical size and the weight. The direct energy converter without any further lossy intermediate steps facilitates the introduction of many further fuel cell applications in the mobile area of vehicles on land, on water and in the air.

DETAILED DESCRIPTION OF THE PRESENTLY PREFERRED EMBODIMENTS

Figure 1:
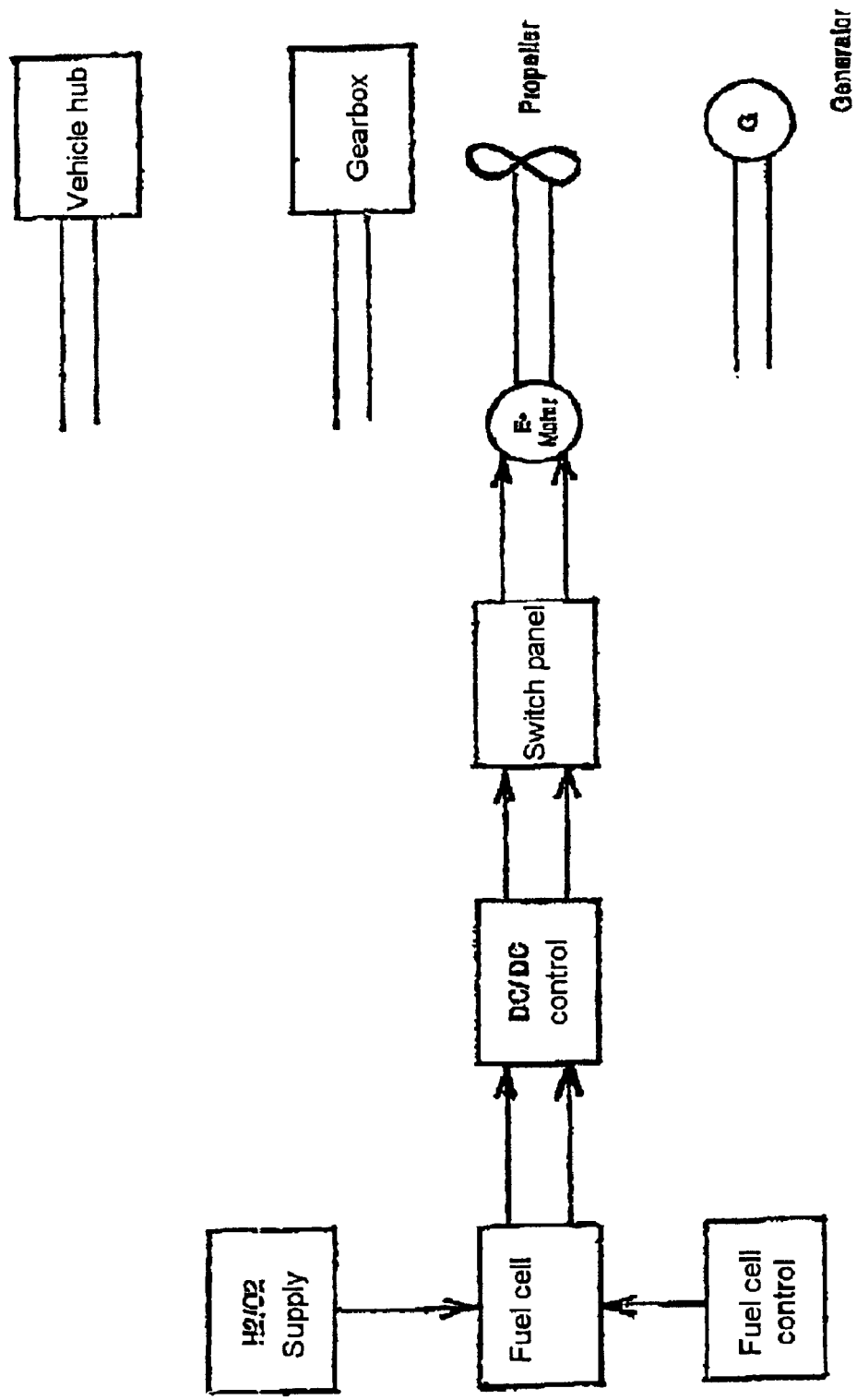
FIG. 1 is a schematic view of a prior art fuel cell system for supplying rotary drive to a load.
Figure 2:
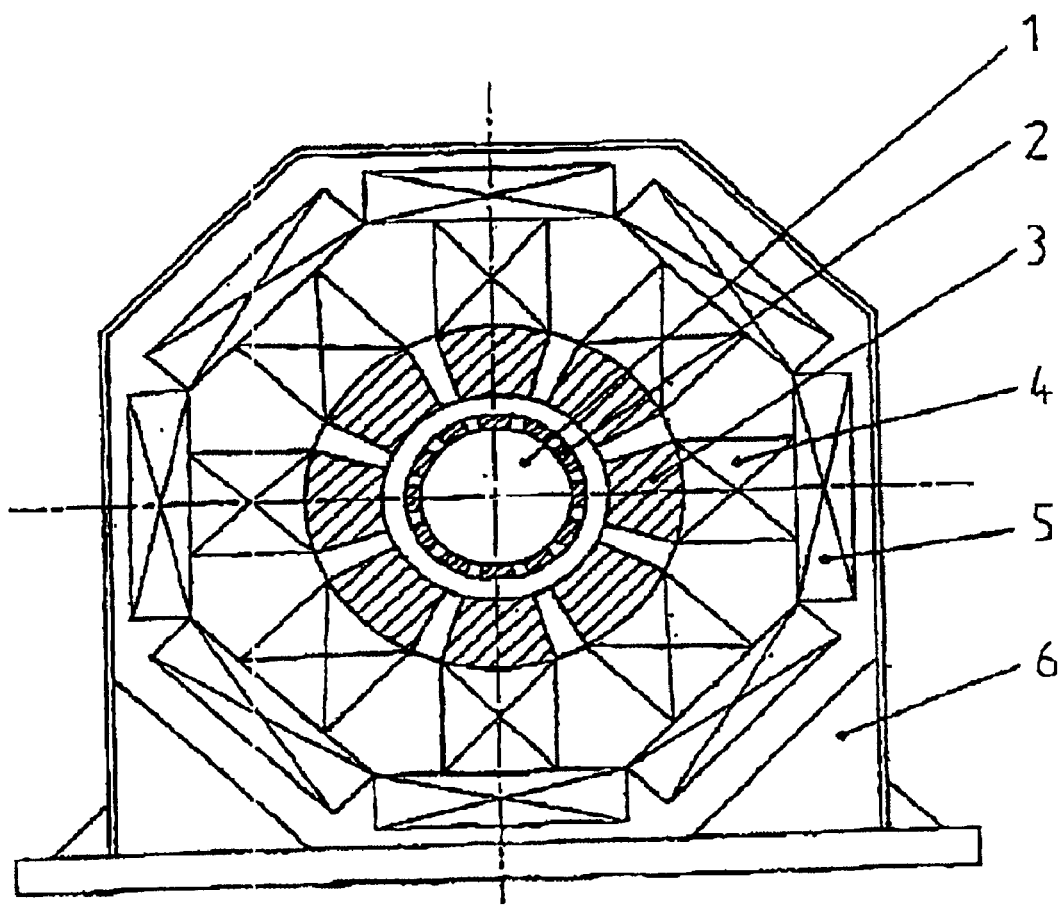
FIG. 2 is a sectional view of a fuel cell torque motor according to an embodiment of the present invention.

The torque motor shown in FIG. 2 comprises a rotor 1 and a stator 6 with permanent magnets 2 arranged on the rotor 1 and armature turns 7 located in the stator 6, which are fed from a commutator 3 having power-electronic components, with the fuel cell modules 4 and fuel cell supply and control elements 5 being integrated in modular form in the commutator 3.

The permanent magnets 2 are arranged in a rotationally symmetrical manner in the form of a drum or disc on the rotation shaft of the motor. There is no external excitation for the electric torque motor in the rotor 1.

The armature current production and commutation take place in the stator 6 of the torque motor, with these being electrically fed directly from the fuel cell modules 4, which are each associated with the stator packs, in the form of modules.

The control and regulation for the fuel cell process and the electric motor power and/or rotation speed regulation are physically integrated in the stator 6.

The fuel cell electronics modules are fed by supplying hydrogen as the fuel and oxygen or air as the oxidant, and produce the directed and guided power for the armature, as well as water as a product.

The losses which are produced during the direct fuel cell energy conversion are dissipated with the product water and, if necessary, by means of cooling water which flows through the fuel cell stacks. All those parts which carry water are fitted only in the stationary, non-rotating part of the torque motor.

What is claimed is:

1. A torque motor, comprising:

a stator;

a rotor having an axis of rotation;

and an internal power source comprising fuel cells arranged in said stator in an annular shape around the axis of rotation, wherein said fuel cells comprise fuel cell modules and fuel cell supply and control elements;

permanent magnets arranged on said rotor and armature turns arranged on said stator; and a commutator having power electronic components connected for feeding said armature turns, said fuel cell modules and fuel cell supply and control elements being integrated in said commutator.

2. The torque motor of claim 1, wherein said permanent magnets are arranged rotationally symmetrically on one of a drum or a disc on said rotor, wherein said torque motor comprises an electric motor operable without external excitation said rotor.

3. The torque motor of claim 2, wherein said commutator and said armature turns are fed directly from said fuel cell modules for producing current in said armature turns.

4. The torque motor of claim 2, wherein control and regulation of the fuel cell process of said fuel cells and of the power and rotational speed of said torque motor are physically integrated in said stator.

5. The torque motor of claim 1, wherein said commutator and said armature turns are fed directly from said fuel cell modules for producing current in said armature turns.

6. The torque motor of claim 1, wherein control and regulation of the fuel cell process of said fuel cells and of the power and rotational speed of said torque motor are physically integrated in said stator.

* * * * *